Oct. 26, 1954  H. W. GLASS  2,692,741
ENERGY ABSORBER FOR ARRESTING AIRPLANES
Filed Aug. 9, 1951
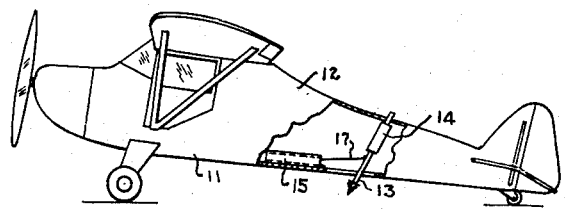
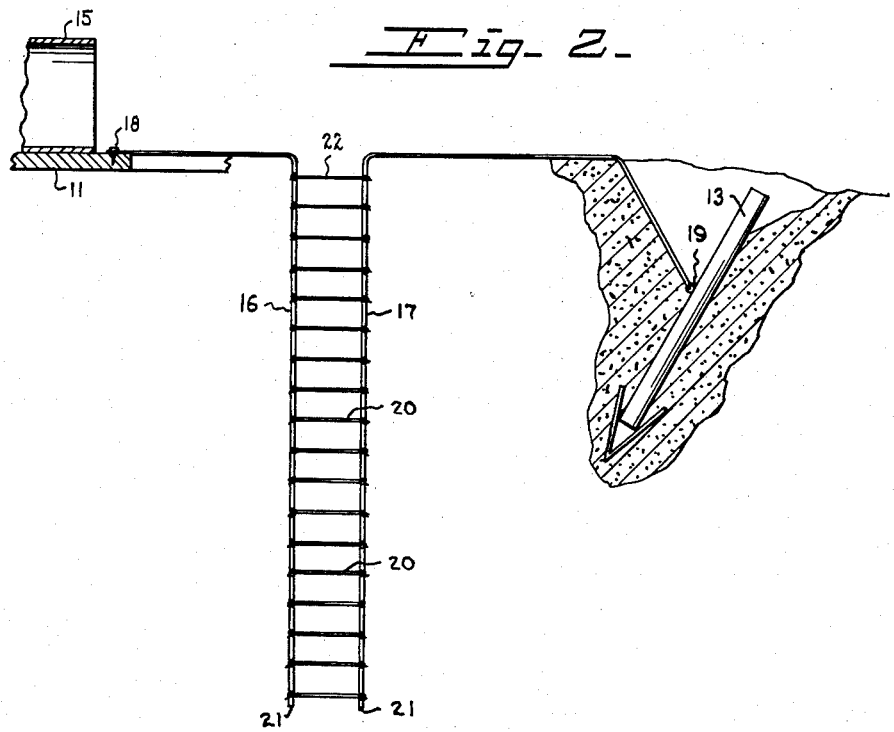
INVENTOR.
HENRY W. GLASS
BY
ATTORNEY.

Patented Oct. 26, 1954

2,692,741

UNITED STATES PATENT OFFICE 2,692,741

ENERGY ABSORBER FOR ARRESTING AIRPLANES

Henry W. Glass, Williamstown, Ky.

Application August 9, 1951, Serial No. 241,027

2 Claims. (Cl. 244—110)

My invention relates to improved means to permit emergency landings of aircraft on small fields. When an emergency arises and a forced landing is necessary and a sufficiently large field is not available for the normal landing run, the pilot can successfully land the aircraft with the aid of my improved device in approximately one-fourth the distance normally required for the given aircraft.

The object of my invention is to provide an aircraft with an energy absorber to limit the ground movement upon landing the aircraft.

A further object is to provide the aircraft with means for discharging an anchor and having a stretchable line connecting the anchor to the aircraft.

A further object is to provide means for successively increasing the tension on the line as it is payed out.

My invention will be further readily understood, from the following description and claims, and from the drawings, in which latter:

Fig. 1 is a side view of an airplane partly broken away to show my improvement mounted therein.

Fig. 2 is a diagrammatic view showing the anchor in the ground and the lines attached together and withdrawn from the tube.

My improved energy absorbing device is arranged to be attached to the fuselage 11 of an airplane 12. A suitable anchor 13 is mounted in a firing device 14 which is fired by remote control from the pilot's cockpit. While I have shown one anchor in this application, the anchoring and guns may be similar to that shown and described in my co-pending application filed January 16, 1951, Serial Number 206,238.

Mounted in the fuselage is a tube 15 into which is packed the lines 16 and 17. The line 16 has one end attached to the fuselage as at 18 and the line 17 has one end attached to the anchor 13 as at 19.

The lines 16 and 17 are each approximately 100 feet long and are made of nylon and are tied together by short strands of nylon cords 20 which are securely knotted to the lines 16 and 17 at spaced intervals from the ends 21. These cords 20 vary in tensil strength with the strongest cord near the ends 21 and being successively weaker, so that as the anchor takes hold in the ground the first connecting cord will break and as each succeeding cord breaks the retarding action will become greater. All of the tie cords are a fraction of the tensil strength of the lines 16 and 17.

The tied lines are packed in the tube 15 with the ends 21 inserted first and the tie cord 22 last so that the lines will pay out of the tube as the cords break and the airplane is halted.

When an emergency landing is necessary on a field of insufficient size, just prior to touching the ground, the pilot presses a button for forming an electrical contact with the percussion cap for firing the gun and the anchor will be driven into the ground at an angle. The momentum of the aircraft will cause the tie cords to successively break and as these cords are successively stronger the forward movement of the aircraft will be halted by the time the last cord is broken. Nylon line has considerable stretch and any impulses set up by the breaking of the tie cords will be dampened by the lines.

Having thus fully described my invention, what I claim as new and desire to secure by Letters Patent, is:

1. An energy absorber for arresting airplanes comprising an airplane, an anchor mounted in said airplane, means for firing said anchor from said airplane into the ground, a stretchable line extending from and connected to said airplane, a second stretchable line parallel to said first named line and connected to said anchor, breakable cords in spaced relation forming connections between said lines, said cords increasing in tensile strength and the breaking of said cords causing a retarded separation of said lines in respect to each other when said anchor is engaged with the ground for arresting the movement of said airplane.

2. An energy absorber for arresting airplanes comprising an airplane, an anchor mounted in said airplane, means for firing said anchor from said airplane into the ground, a stretchable line extending from and connected to said airplane, a second stretchable line parallel to said first named line and connected to said anchor, breakable cords in spaced relation forming connections between said lines, said cords increasing in tensile strength and the breaking of said cords causing an increased retarded separation of said lines in respect to each other when said anchor is engaged with the ground for arresting the movement of said airplane, a tube mounted in said airplane, and said lines packed in said tube and payed from said tube when said anchor is fired.

References Cited in the file of this patent

UNITED STATES PATENTS

| Number | Name | Date |
|---|---|---|
| 2,352,036 | Tauty | June 20, 1944 |
| 2,474,125 | Schultz | June 21, 1949 |
| 2,475,597 | Dickson | July 12, 1949 |

FOREIGN PATENTS

| Number | Country | Date |
|---|---|---|
| 334,084 | Great Britain | Aug. 28, 1930 |
| 549,953 | Great Britain | Dec. 15, 1942 |
| 533,475 | France | Dec. 10, 1921 |
| 843,180 | France | Mar. 20, 1939 |